V. G. APPLE.
TRANSMISSION GEARING.
APPLICATION FILED JUNE 1, 1914.
1,133,784.
Patented Mar. 30, 1915.
4 SHEETS—SHEET 1.
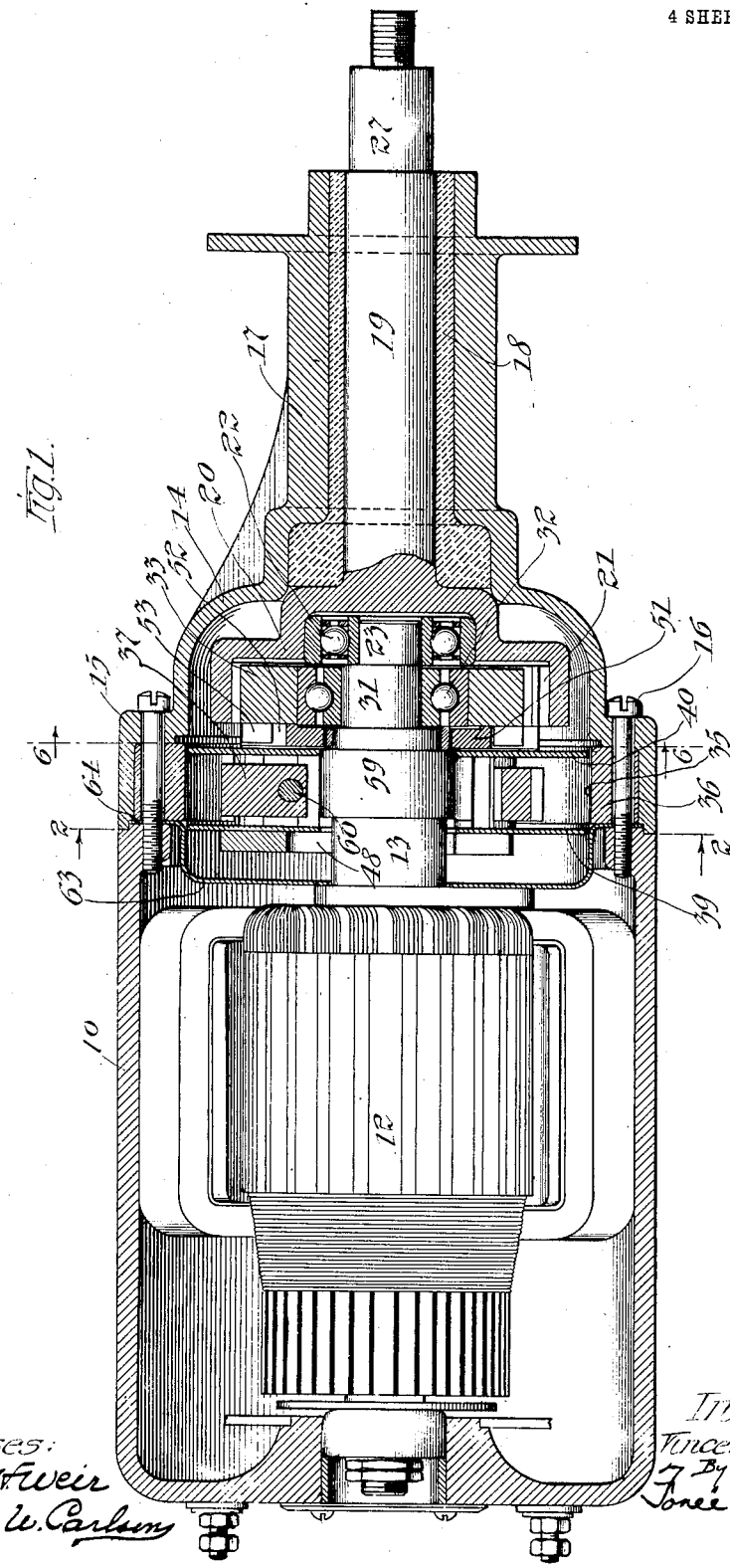

V. G. APPLE.
TRANSMISSION GEARING.
APPLICATION FILED JUNE 1, 1914.
1,133,784.
Patented Mar. 30, 1915.
4 SHEETS—SHEET 2.
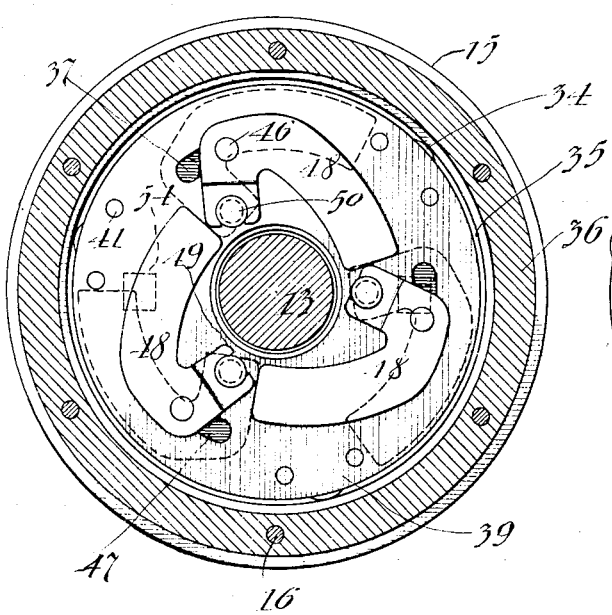
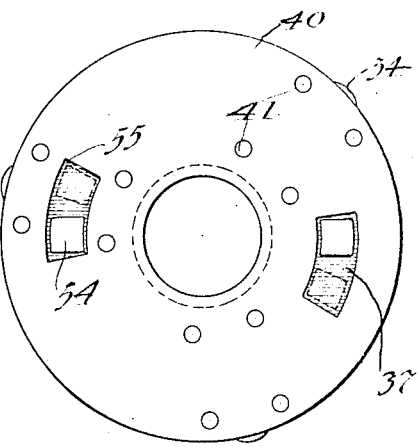
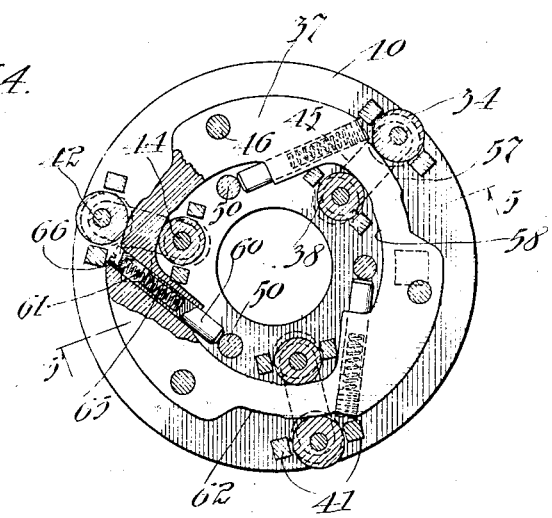
Witnesses:
Robert F. Weir
Arthur W. Carlson
Inventor
Vincent G. Apple
By Foree Bain May
Attys

V. G. APPLE.
TRANSMISSION GEARING.
APPLICATION FILED JUNE 1, 1914.

1,133,784.

Patented Mar. 30, 1915.
4 SHEETS—SHEET 3.

V. G. APPLE.
TRANSMISSION GEARING.
APPLICATION FILED JUNE 1, 1914.

1,133,784.

Patented Mar. 30, 1915.
4 SHEETS—SHEET 4.

Witnesses:
Robert F. Weir
Arthur W. Carlson

Inventor
Vincent G. Apple
Fonée Bain May
Attys

UNITED STATES PATENT OFFICE.

VINCENT G. APPLE, OF DAYTON, OHIO, ASSIGNOR TO THE APPLE ELECTRIC COMPANY, OF DAYTON, OHIO, A CORPORATION OF OHIO.

TRANSMISSION-GEARING.

1,133,784.     Specification of Letters Patent.     Patented Mar. 30, 1915.

Application filed June 1, 1914. Serial No. 842,205.

*To all whom it may concern:*

Be it known that I, VINCENT G. APPLE, a citizen of the United States, residing at Dayton, in the county of Montgomery and State of Ohio, have invented certain new and useful Improvements in Transmission-Gearing, of which the following is a specification.

This invention relates to improvements in transmission gearing and more particularly to a gearing adapted to be interposed between a dynamo, adapted to serve both as motor and generator, and an internal combustion engine.

One of the objects of my invention is to provide a transmision gearing for interposition between a dynamo and internal combustion engine which, when the dynamo serves as a motor, transmits power at a reduced speed to the shaft of the engine and when the engine takes up its cycle of operation and becomes a driver, it automatically eliminates the reduction gearing and provides a direct drive through to the dynamo for its operation as a generator.

Another object of my invention is to provide such a gearing in which the parts, which move relative to each other when the dynamo serves as a motor, will, on the reversal in direction of drive, rotate in unison as a single part when the driver attains a predetermined speed.

Still another object of my invention is to provide such a gearing which shall be efficient, light, positive in its action and sufficiently compact to permit its mounting within the end portion of a dynamo casing.

Other and further objects will become apparent to those skilled in the art, from a consideration of the following description and drawings, wherein—

Figure 6:
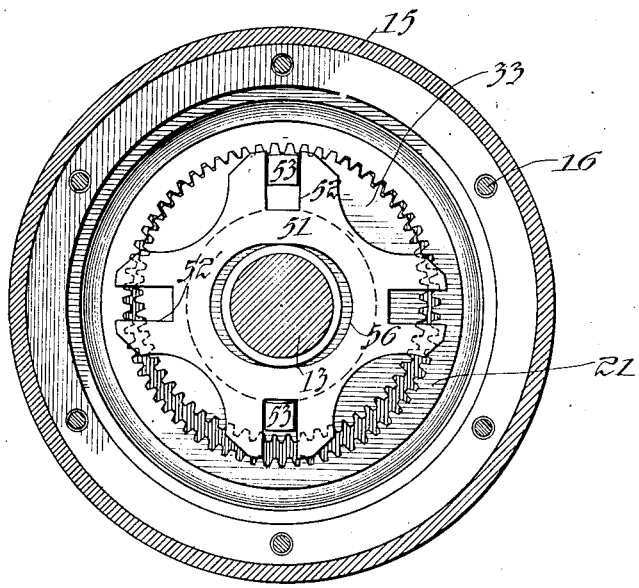
Figure 7:
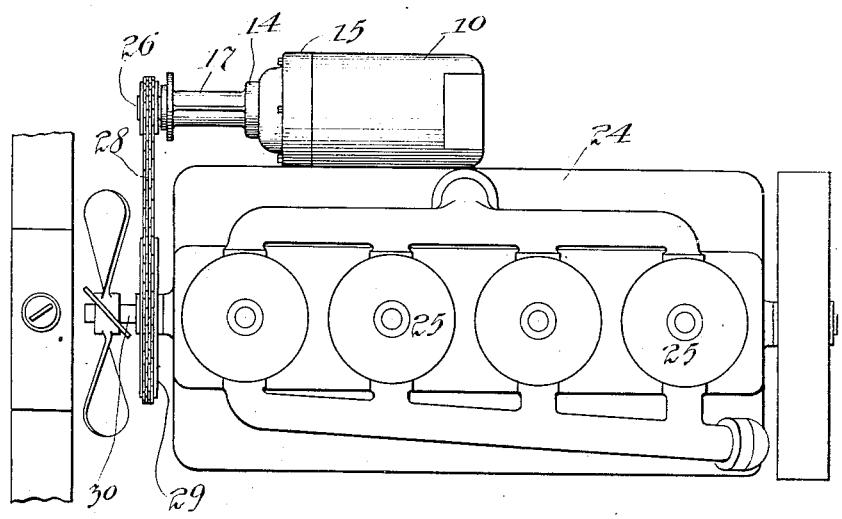
Figure 8:
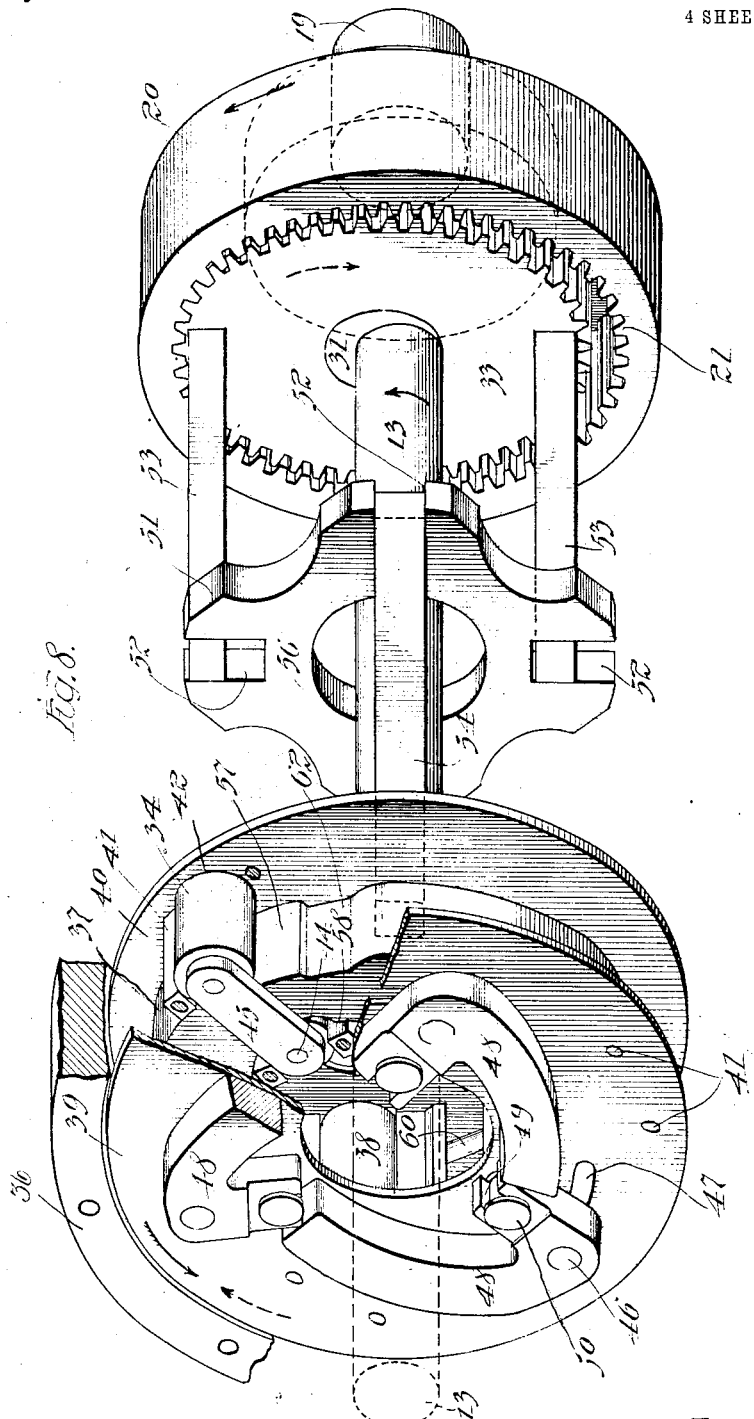

Figure 1 is an axial sectional view through my improved gearing showing it mounted upon a dynamo. Fig. 2 is a transverse sectional view on the line 2—2 of Fig. 1. Fig. 3 is an end elevation of the clutch containing part. Fig. 4 is a transverse sectional view on the line 4—4 of Fig. 5, with parts broken away. Fig. 5 is an axial sectional view on the line 5—5 of Fig. 4. Fig. 6 is a transverse sectional view on the line 6—6 of Fig. 1. Fig. 7 is a plan view of an internal combustion engine showing a dynamo carrying my improved gearing mounted thereon, and; Fig. 8 is a pseudo elongated perspective view with parts broken away to graphically illustrate the operation of my gearing.

Referring to the drawings, the numeral 10 indicates the frame of a dynamo electric machine within which is mounted the armature 12 carried on the shaft 13. A bell shaped end casing 14 is flanged as at 15, for connection with an end of the frame 10, by means of the screws 16. The outer end of the casing is reduced in diameter and carries a tubular extension 17 receiving the bearing 18 within which is journaled the short shaft 19. The shaft 19 is flanged outwardly at its inner end, into a double stepped cup shaped part 20, carrying on its outer step the internal gear 21 and at its inner step an annular bearing 22 within which is journaled the forwardly extending reduced end 23 of the shaft 13.

In Fig. 7 I have shown the dynamo as mounted on the side of the crank case 24 of an internal combustion engine 25. A sprocket wheel 26 is mounted on the outwardly extending end 27 of the stub shaft 19 and is connected through the medium of a chain 28 with the sprocket wheel 29 mounted directly on the shaft 30 of the engine.

An eccentric 31 is carried by the shaft directly at the rear of the reduced end 23. The annular bearing 32 surrounds the eccentric 31 and carries the pinion 33 meshing with the internal gear 21. This comprises the well known form of eccentric reduction gearing in which the internal gear and the spur gear have a different number of teeth and a slow drive, giving great reduction in speed, effected by the rotation of the eccentric wabbling the spur gear which is held by a universal connection from actual rotation.

For the purpose of holding the spur gear against rotation, when it is desired to transmit power from the dynamo armature through to the shaft 19 I have provided a roller clutch mechanism in which the outer rollers 34 normally engage with the race way 35 formed on the inner face of the ring 36 carried in an annular recess formed in the flanged end 15 of the casing 14. The clutch mechanism comprises in general a body ring 37, outer rollers 34, inner rollers 38, and the disks 39 and 40 positioned at each side of the body ring 37, rotatable relative thereto, and secured together in spaced relation by the transverse bars 41 positioned in pairs at each side of the rollers. The rollers are carried by transverse pins 42 and 44 joined together by the links 45 which extend radially across the outer edges of the body ring 37 inside the disks 39 and 40. The bars 41 likewise act as roller retaining cages and insure proper positioning of the rollers with respect to the disks 39 and 40. Pins 46 extend axially from the body ring 37 through arcuate slots 47 in the disk 39 and are journaled in the L shaped governor arms 48 adjacent the shorter legs thereof. The inner ends of the L shaped governor arms 48 are slotted, as at 49, and engage with the pins 50 secured in the disk 39. Outward movement of the longer, heavier ends of the L shaped governor arms 48 cause sliding movement of the pins 46 within the arcuate slots 47 resulting in the relative rotation of the body ring 37 with respect to the disk 39.

In order to provide universal connection between the pinion 33 and the clutch mechanism I have provided a slotted plate 51 resembling somewhat a Maltese cross and having diagonally opposite pairs of slots 52 and 52'. Lugs 53 extend inwardly from the pinion 33 and slidably engage the slots 52 and a second pair of lugs 54 extends forward from the body ring 37 through arcuate slots 55 in the plate 40 and engage with the other pair of slots 52'. The opening 56 at the center of the plate 50 is considerably larger than the shaft 13 so as to permit oscillation or wabbling of the plate 51 without interference. The outer surface of the body ring 37, adjacent each of the rollers, is inclined or cam shaped, as at 57, for coaction with the rollers 34 and the inner surface of the ring 37 is cam shaped, as at 58, adjacent the inner rollers for coaction therewith. The inner rollers when forced inward by the cam 48 contact with the enlarged portion 59 of the shaft 13.

The pins 50, upon which the governor arms are pivoted extend entirely across the disks 39 and 40 within the body ring 37 and are engaged by the spring pressed plungers 60 carried in openings 61 in the body ring. The plungers 60 are pressed inwardly by the springs 65, the outer ends of which abut against the threaded screws 66 thus providing a means for adjusting the resistance to the centrifugal action of the governor arms and determining the speed at which the inward shifting of the roller clutches 38 and 34 shall take place. The action of the spring pressed plungers 60 is to normally insure the relative positioning of the body ring 37 and disks 39 and 40 so that the rollers 34 are pressed toward the highest points of their cams and consequently outward into engagement with the race way 35.

As the governor arms 48 fly outwardly under the influence of centrifugal action the body ring 37 is rotated relative to the disks 39 and 40 until the outer rollers 34 are positioned opposite the depressions 62 in the body ring and the inner rollers are wedged inward by the cam surfaces 58 until they coact with the shaft enlargement 59 and are then permitted to act as roller clutches gripping the shaft 59 and locking the clutch mechanism thereto. A cup shaped wall 63 is flanged outwardly as at 64, to lie between the adjoining surfaces of the end wall of the frame 10 and the inner wall of the ring 36, thus inclosing the governor arms and forming a protecting partition between the clutch mechanism and the windings of the dynamo, such as the armature and field coils.

The operation of the device is as follows: Considering first all parts of the apparatus at rest we will assume that the operator wishes to start the internal combustion engine. Closing the proper circuit switch, current is directed through the dynamo armature and field windings causing the shaft 13 to rotate in the direction indicated by the arrow, in Fig. 8. As the internal gear 20 together with its shaft 19 is connected to the shaft of the itnernal combustion engine the resistance to its rotation is considerable and the first tendency of the pinion 33 will be to rotate about the eccentric 31 in a direction indicated by the dotted arrow. This torque is communicated, through the universal plate 51, to the control member carrying the roller clutches 38 and 34, and its tendency will be to rotate in the same direction with the spur gear 33. As before stated the roller clutches 34 are normally operative, being pressed into engagement with the ring 36 by the cam shaped portion 57 of the ring 37. The tendency of the control member to rotate in the direction indicated by the dotted arrow, is therefore prevented by the locking engagement of the outer roller 34 with the ring 36 and the inevitable result is the rotation of the internal gear wheel 21 in the direction indicated by the solid arrow. In the present instance, the spur gear wheel has a less number of teeth than the internal gear wheel and will therefore drive the spur gear wheel in the same direction as the driving shaft. The engine shaft is thus rotated until the engine takes up its cycle of operation at which time its speed is greatly increased and the reversal of direction in drive causes the internal gear 21 to become the driver, carrying around with it the spur gear 33 and through the medium of the universal plate 51 rotates the control member in the direction indicated by the solid arrow. As the roller clutches 34 are uni-directional in their action the control member is free to rotate in the direction indicated by the solid arrow though locked from rotation in the opposite direction. As the speed of the control member increases the governor arms 48 fly outwardly, under the influence of centrifugal action, rotating the ring 37, relative to the outer disks 39 and 40, thus wedging inwardly the rollers 38 and 34 until the inner rollers 38 engage the enlarged portion 59 of the armature shaft 13. The direction of roller grip is such that on coming in contact with the shaft the rollers 38 instantly lock the control member thereto and the entire gearing, together with its appurtenant parts, rotates as a unit with the armature shaft, the drive being direct from the shaft 19, through to the shaft 13, without reduction of speed. When this direct drive obtains the rollers 34 are drawn inwardly away from contact with the ring 36 and any noise or friction, incident to the engagement of relatively moving parts, is eliminated. Obviously a lessening in speed of the control member permits the spring pressed plunger 60 to rotate the body ring 37, moving outwardly the rollers 38 and 34 until the inner set becomes inoperative and the outer set is pressed into engagement with the ring 36. Changing the tension of the springs actuating the plunger 60 permits adjustment of the governor for operation at any desired speed.

Having described my invention, what I claim is:

1. In a power transmission gearing, the combination of a primary rotatable member; a secondary rotatable member; speed reducing gearing between the two members including a control member; a clutch for locking said control member from rotation; a clutch for connecting said control member to one of the rotatable members, and centrifugally operated means for actuating said clutches.

2. In a power transmission gearing, the combination of a primary shaft; a secondary shaft; speed reducing gearing between the two shafts including a control member; a clutch for locking said control member from rotation; a normally inoperative one way roller clutch for connecting said control member to one of the shafts, and centrifugally operated means for actuating said roller clutch.

3. In a power transmission gearing, the combination of a primary shaft; a secondary shaft; speed reducing gearing between the shafts, including a control member; a clutch for locking said control member from rotation; a clutch for connecting said control member to one of the shafts, and centrifugally operated means for releasing the first mentioned clutch and causing the engagement of the second clutch.

4. In a power transmission gearing, the combination of a primary shaft; a secondary shaft; speed reducing gearing between the two shafts, including a control member; a stationary member; a one way roller clutch carried by said control member and engaging with the stationary member, and centrifugally operating means for retracting said roller clutch from engagement with the stationary member.

5. In a power transmission gearing, the combination of a primary shaft; a secondary shaft; speed reducing gearing between the two shafts, including a control member; a normally inoperative one way roller clutch carried by said control member and adapted to engage one of the said shafts and centrifugally operated means for causing the engagement of said roller clutch with the said shaft.

6. In a power transmission gearing the combination of a primary shaft, a secondary shaft, speed reducing gearing including an oscillating differential gear and control member, a clutch carried by said control member for locking the same against rotation, and centrifugally operated means for actuating said clutch.

7. In a power transmission gearing the combination of a primary shaft, a secondary shaft, speed reducing gearing including an oscillating differential gear and control member, a normally operative one way roller clutch carried by said control member and centrifugally operated means for releasing said clutch.

8. In a power transmission gearing the combination of a primary shaft; a secondary shaft; speed reducing gearing between the two shafts including an eccentric; a pinion carried thereby; an internal gear meshing with said pinion and having a different number of teeth therefrom; a clutch normally engaging a stationary part and universally connected to one of said gears and speed responsive means for releasing said clutch.

9. In a power transmission gearing the combination of a primary shaft; a secondary shaft; speed reducing gearing between the two shafts including an eccentric; a spur gear carried thereby; an internal gear meshing with said eccentric; a control member connected with one of said gears; a stationary member; a roller clutch carried by said control member and normally in engagement with said stationary member; a second normally inoperative roller clutch carried by said control member, and adapted to engage one of the shafts and speed responsive means for disengaging the first clutch and causing the engagement of the second.

10. In a power transmission gearing the combination of a primary shaft; a secondary shaft; an eccentric on the primary shaft; a spur gear carried thereby; an internal gear meshing with the spur gear and carried by the secondary shaft; a control member universally connected to the spur gear; a normally operative clutch for locking said control member from rotation; a clutch for connecting said control member to the primary shaft, and speed responsive means for actuating said clutches.

11. In a power transmission gearing, the combination of a primary shaft; a secondary shaft; an eccentric carried by the primary shaft; a spur gear rotatable thereon; an internal gear meshing with the spur gear and carried by the secondary shaft; a control member universally connected to the spur gear; a normally operative one way roller clutch for locking said control member from rotation; a normally inoperative one way roller clutch for connecting said control member to the primary shaft, and centrifugally operable means for disengaging the first clutch and causing the engagement of the second clutch.

12. In a power transmission gearing, the combination of a primary shaft; a secondary shaft; speed reducing gearing comprising an eccentric carried by the primary shaft; a spur gear mounted thereon; an internal gear meshing with the spur gear and carried by the secondary shaft; a control member universally connected to the spur gear; a uni-directionally operable clutch for locking said control member from rotation in one direction; a normally inoperative clutch carried by said control member and adapted to engage the primary shaft and speed responsive means for causing the engagement of said last mentioned clutch.

13. In a power transmission gearing the combination of a primary shaft; a secondary shaft; speed reducing gearing comprising an eccentric carried by the primary shaft; a spur gear rotatable thereon, an internal gear meshing with the spur gear and carried by the secondary shaft; a control member universally connected to the spur gear; a stationary casing; a one way roller clutch carried by said control member and normally engaging said casing; a normally inoperative roller clutch; carried by said control member and adapted to engage the primary shaft, and speed responsive means for disengaging said first mentioned roller clutch from the casing and radially moving the second mentioned roller clutch into engagement with the primary shaft.

In testimony whereof I hereunto set my hand in the presence of two subscribing witnesses.

VINCENT G. APPLE.

In the presence of—
E. V. MARTIN,
S. R. PRUGH.